(12) United States Patent
Kramer

(10) Patent No.: US 9,967,243 B2
(45) Date of Patent: May 8, 2018

(54) METHOD AND SYSTEM FOR ACCESSING DATA IN A DISTRIBUTED NETWORK SYSTEM

(71) Applicant: OMS SOFTWARE GMBH, Munich (DE)

(72) Inventor: Christian Kramer, Munich (DE)

(73) Assignee: OMS SOFTWARE GMBH, Munich (DE)

( * ) Notice: Subject to any disclaimer, the term of this patent is extended or adjusted under 35 U.S.C. 154(b) by 239 days.

(21) Appl. No.: 14/704,011

(22) Filed: May 5, 2015

(65) Prior Publication Data

US 2015/0237034 A1    Aug. 20, 2015

Related U.S. Application Data

(63) Continuation of application No. PCT/EP2013/071565, filed on Oct. 15, 2013.

(30) Foreign Application Priority Data

Nov. 5, 2012  (DE) .................. 10 2012 110 544

(51) Int. Cl.
*G06F 15/16* (2006.01)
*H04L 29/06* (2006.01)
(Continued)

(52) U.S. Cl.
CPC ........ *H04L 63/08* (2013.01); *G06F 17/30563* (2013.01); *H04L 67/10* (2013.01)

(58) Field of Classification Search
None
See application file for complete search history.

(56) References Cited

U.S. PATENT DOCUMENTS 5,764,639 A * 6/1998 Staples ................ H04M 7/128
370/359
6,222,533 B1 * 4/2001 Notani .................... H04L 29/06
715/733

(Continued)

OTHER PUBLICATIONS

English translation of a German Search Report issued for corresponding German Patent Application No. 10 2012 110 544.8 dated Aug. 30, 2013.

(Continued)

*Primary Examiner* — Brian Whipple
(74) *Attorney, Agent, or Firm* — Myers, Wolin, LLC; Harris Wolin

(57) ABSTRACT

Disclosed are a method and a system for accessing data by a client device in a distributed network system having a central server system, at least one client device, and at least one business object server. The client device and business object server are coupled to the central server system via a communication network. In the business object server, a number of business objects are stored. Each business object server includes a number of offices; each business object is assigned to an office in the respective business object server. The central server system receives an access request message, which includes at least one unique client identifier; the central server system determines at least one access authorization by means of the client identifier, and generates access instructions for the business objects, which the client device is allowed to access. The business objects are read and are transmitted to the client device.

23 Claims, 5 Drawing Sheets

(51) Int. Cl.
*H04L 29/08* (2006.01)
*G06F 17/30* (2006.01)

(56) References Cited

U.S. PATENT DOCUMENTS

| | | | | |
|---|---|---|---|---|
| 6,782,398 | B1* | 8/2004 | Bahl | H04L 67/1095 |
| 2002/0108060 | A1* | 8/2002 | Takamoto | H04L 63/083 |
| | | | | 726/4 |
| 2004/0148409 | A1 | 7/2004 | Davis et al. | |
| 2007/0005774 | A1 | 1/2007 | Singh et al. | |
| 2007/0283014 | A1* | 12/2007 | Shinomiya | H04L 12/2856 |
| | | | | 709/225 |
| 2009/0247134 | A1 | 10/2009 | Jeide et al. | |
| 2011/0277026 | A1 | 11/2011 | Agarwal et al. | |
| 2012/0150843 | A1 | 6/2012 | Robert et al. | |
| 2012/0246112 | A1* | 9/2012 | Gonzalez | G06F 17/30174 |
| | | | | 707/610 |
| 2013/0024919 | A1* | 1/2013 | Wetter | G06F 21/335 |
| | | | | 726/6 |

OTHER PUBLICATIONS

International Search Report dated Jan. 16, 2014 in corresponding International Application No. PCT/EP2013/071565.
German communication issued in corresponding German Patent Application No. 13779549.8 dated Mar. 9, 2017.

\* cited by examiner (a)            (b)

METHOD AND SYSTEM FOR ACCESSING DATA IN A DISTRIBUTED NETWORK SYSTEM

CROSS-REFERENCE TO RELATED APPLICATIONS

This application is a Continuation of International Application No. PCT/EP2013/071565, filed on Oct. 15, 2013, which claims the benefit of German Application No. 10 2012 110 544.8 filed on Nov. 5, 2012. The contents of both the International Application No. PCT/EP2013/071565 and German Application No. 10 2012 110 544.8 are hereby incorporated by reference.

FIELD OF THE INVENTION

The invention relates to a method for accessing data by a client device in a distributed network system, wherein the data is stored at different server means in a decentralized manner. Further, the invention relates to a system for accessing data by a client means, wherein the system is adapted to carry out the method according to the invention.

BACKGROUND

It is known to store data on different server means in a decentralized manner, and to allow a number of users access to the data stored decentralized. Usually, the users access the data stored in the server means via a client means. In a company's internal computer network, which may comprise a number of server means, access permits are granted to the users, which allow the users to access data stored in the server means. This type of access on the data or the installing of corresponding access permits, however, is only then convenient as long as the client means via which a user accesses the data is a component of the company's internal computer network.

It is desirable to allow a user access to data, which are stored in server means, which belong to different computer networks, as for example, of different companies.

In order to achieve this, in prior art it is necessary that each company has to grant the corresponding access permits for an external user, and has to provide the user with corresponding access data, as login and password. A user may then log into a computer network of a company, and after a successful log in, access data for which the user has the required access permit.

For the access data of another company, it is, however, necessary that the user also logs into the computer network of the other company. According to prior art, it is also necessary that a user, in case he/she wants to access computer networks of different companies, has to log into each computer network separately. This procedure is, on the one hand, inconvenient for the user, because he/she has to log into or register with each computer network separately. On the other hand, for each computer network, the user is provided with own access data, involving for the user an increased effort for the management of the access data. Moreover, the user has to ensure that the access data to the different computer networks are kept safe in order to avoid misuse.

A further disadvantage is that a user, if he/she has logged into computer networks of different companies, may access the data in the respective computer networks. However, he/she is only able to view the data of a single company. A uniform view on all data of all companies, into which the user has logged into thereby, however, is not possible.

US 2012/0150843 A1 tries to solve this problem. US 2012/0150843 A1 teaches a method according to which a user may register with several networks in order to access data of these networks. Thereby, an identifier usable across domains (or usable across servers) is generated by an ID-Association-server for a user, which is assigned to one or more user specific identifiers. By means of the user specific identifiers, a user may log into a certain network. Data relevant to safety of the user (e.g., credit card information) is managed by the ID-Association-server such that this data does not have or is not able to be managed by the network. Thereby, it should be ensured that several networks are able to exchange data (e.g., transaction data) of a user amongst each other without the safety relevant data being able to be exchanged.

Thereby, however, the problem is not solved that a user has to log into several networks, if he/she wants to access several networks simultaneously or in parallel. He/she has to log into each network separately and individually. Also, thereby the problem is not solved that the user is provided with a uniform view on the data from different networks. The data of a network has to be requested separately from the data of another network, and is provided to the user independently of each other.

SUMMARY

The invention is based on the object to provide solutions, which at least partially avoid the disadvantages from prior art, and which allow a user to access data in a simple and secure manner, which is stored in different computer networks, and which allows a transparent and uniform view on the data to the user.

Accordingly, one embodiment of the invention provides a method for accessing data by a client means in a distributed network system having a central server system, at least one client means, and at least one business object server is provided, wherein the at least one client means and the at least one business object server are coupled to the central server system via a communication network, wherein a number of business objects is stored in the business object server, wherein each business object server comprises a number of offices, wherein each business object in the respective business object server is assigned to an office (the offices in the respective business object servers are logical offices), the central server system receives from the client means an access request message, wherein the access request message comprises at least one unique client identifier, the central server system determines at least one access permit by means of the client identifier, wherein an access permit indicates, which offices and which business objects of the offices the client means is allowed to access, and the central server system for the business objects, which the client means is allowed to access, generates access instructions, wherein by means of the access instructions, the business objects of the respective offices in the respective business object server can be read and transmitted to the client means.

According to one embodiment, the central server system harmonizes the business objects prior to transmission to the client means.

According to another embodiment, in the central server system in a first relation, the client identifier is assigned to at least one office identifier, wherein the office identifier identifies an office in the business object servers uniquely, in a second relation, an office identifier is assigned to a business object server, and in a third relation, a tuple from a business object server and an adapter is assigned to a tuple from an office identifier and an office identifier, wherein the relations are stored in a database being operatively coupled to the central server system, wherein the central server system determines on the basis of the first and second relations, which business object server the client means accesses, wherein the central server system, on the basis of the third relation, selects an adapter and transmits to the selected adapter the access instructions for reading the business objects.

According to one embodiment, the access instructions comprise at least the client identifier. Thereby, it is enabled that also the corresponding business object server checks on the level of the business objects an access authorization of each business object to be read.

According to one embodiment, the central server system comprises a security module, which determines the access authorizations, wherein the access authorizations are stored in the central server system and/or in the business object servers.

According to one embodiment, the central server system comprises a transformation service for harmonizing the business objects read, wherein the transformation service, after reading the business objects, transforms the business objects from a server data structure into a client data structure, and provides the transformed business objects for transmission to the client means.

According to one embodiment, the transformation of the business objects from the server data structure into the client data structure is effected on the basis of predetermined transformation rules.

According to one embodiment, each of the transformation rules indicate, which data field of the server data structure is transformed into which data fields of the client data structure.

According to one embodiment, the central server system, prior to receiving the access request message, receives login data from the client means, wherein the login data comprise at least the client identifier.

According to one embodiment, the central server system, by means of the client identifier received together with the login data, determines the office identifiers assigned to the client identifier and the first relation automatically, such that the client means is logged into the offices identified by the office identifiers automatically. Thus, the user does not have to log into each individual office separately, in order to request the respective business objects stored there.

According to one embodiment, the network system comprises at least two business object servers having respectively at least two offices.

According to one embodiment, the access instructions are translated by the respective adapter into concrete requests, wherein the concrete requests are adapted to access the respective business object servers, and wherein the respective adapters execute the concrete requests, or access the respective business object servers by means of the concrete requests.

According to one embodiment, the concrete requests comprise at least one selected from database requests, function calls, Web service calls, RPC calls, and a combination thereof.

Further, another embodiment of the invention provides a system for accessing data by a client means is provided, wherein the system comprises at least a central server system, wherein the central server system can be coupled to at least one client means and to at least one business object server via a communication network, wherein in the at least one business object server, a number of business objects is stored, wherein each business object server comprises a number of offices, wherein each business object is assigned to an office in the respective business object server, and wherein the central server system comprises means for receiving an access request message from the client means, wherein the access request message comprises at least one unique client identifier, comprises means being adapted to determine on the basis of the client identifier, which offices and which business objects of the offices the client means is allowed to access, comprises a number of adapters, wherein the central server system is adapted to select, for each business object, which the client means is allowed to access, an adapter from the number of adapters, and to transmit access instructions to the respective adapter, wherein each adapter is adapted to read, on the basis of the access instructions, business objects from the respective business object servers, and to provide the business objects read for transmission to the client means.

Moreover, according to one embodiment, the system comprises a database, which is coupled to the central server system operatively, wherein in the database a first relation is stored, by means of which a client identifier is assigned to at least one office identifier, wherein the office identifier identifies an office in the business object servers uniquely, a second relation is stored, by means of which an office identifier is assigned to a business object server, and a third relation is stored, by means of which a tuple from an office identifier and an office identifier is assigned to at least one tuple from a business object server and an adapter, wherein the central server system is adapted to determine, on the basis of the first and second relations, which business object servers the client means is allowed to access, and to select, on the basis of the third relation, an adapter and to transmit, to the selected adapter, access instructions for reading the business objects.

According to one embodiment, the central server system comprises a security module, which is adapted to determine, on the basis of the client identifier, which offices and which business objects of the offices the client means is allowed to access.

According to one embodiment, the central server system comprises a transformation service, wherein the transformation service is adapted to after reading the business objects from the business object servers, to transform the business objects read from a server data structure into a client data structure on the basis of predetermined transformation rules, in order to harmonize the business objects read.

According to one embodiment, the central server system comprises a login module, by means of which the login data from the client means are received, wherein the login data comprise at least the client identifier.

According to one embodiment, the central server system is adapted to determine, on the basis of the client identifier received together with the login data, the office identifiers assigned to the client identifier in the first relation automatically such that the client means is logged into the identified offices automatically by means of the office identifiers.

According to one embodiment, the central server system is located within a cloud, wherein the communication network is configured as wireless and/or wired Internet connection.

Further, another embodiment provides a method for accessing data, which is stored in at least one business object server, is provided, wherein the at least one business object server is coupled to a central server system, wherein the central server system is coupled to at least one client means, wherein each business object server comprises a number of offices, wherein each business object within the respective business object server is assigned to an office, and wherein
the central server system, after a user has registered with the central server system via a client means, logs the registered user into a number of offices automatically, which are assigned to the user, and
the central server system allows the registered user access to each business objects, which are assigned to the offices, in which the user has logged in, and for which corresponding access authorizations are assigned to the user.

According to one embodiment, the central server system, after the user has registered with the central server system via a client means, receives from the client means an access request message comprising information on which business objects are to be read from the business object servers, wherein the central server system reads the business objects from the business object servers, and transmits the business objects read to the client means.

According to one embodiment, the central server means, prior to reading the business objects, determines by which business object servers the business objects can be read.

According to one embodiment, the determining comprises a step of checking for which business objects of the client means or the user of the client means, a corresponding access authorization is assigned, wherein the respective access authorizations are stored in the central server system and/or in the business object servers.

It is advantageous, if the access to the offices and/or the access to the business object servers is transparent for the user.

According to one embodiment, a transformation service of the central server system, after reading the business objects from the offices of the business object servers, transforms the business objects read from a server data structure into a client data structure, in order to harmonize the business objects read.

According to one embodiment, the transformation is effected according to a number of transformation rules, wherein each of the transformation rules indicates, which data field of the server data structure is transformed into which data field of the client data structure.

DETAILED DESCRIPTION OF THE PREFERRED EMBODIMENTS

Figure 1:
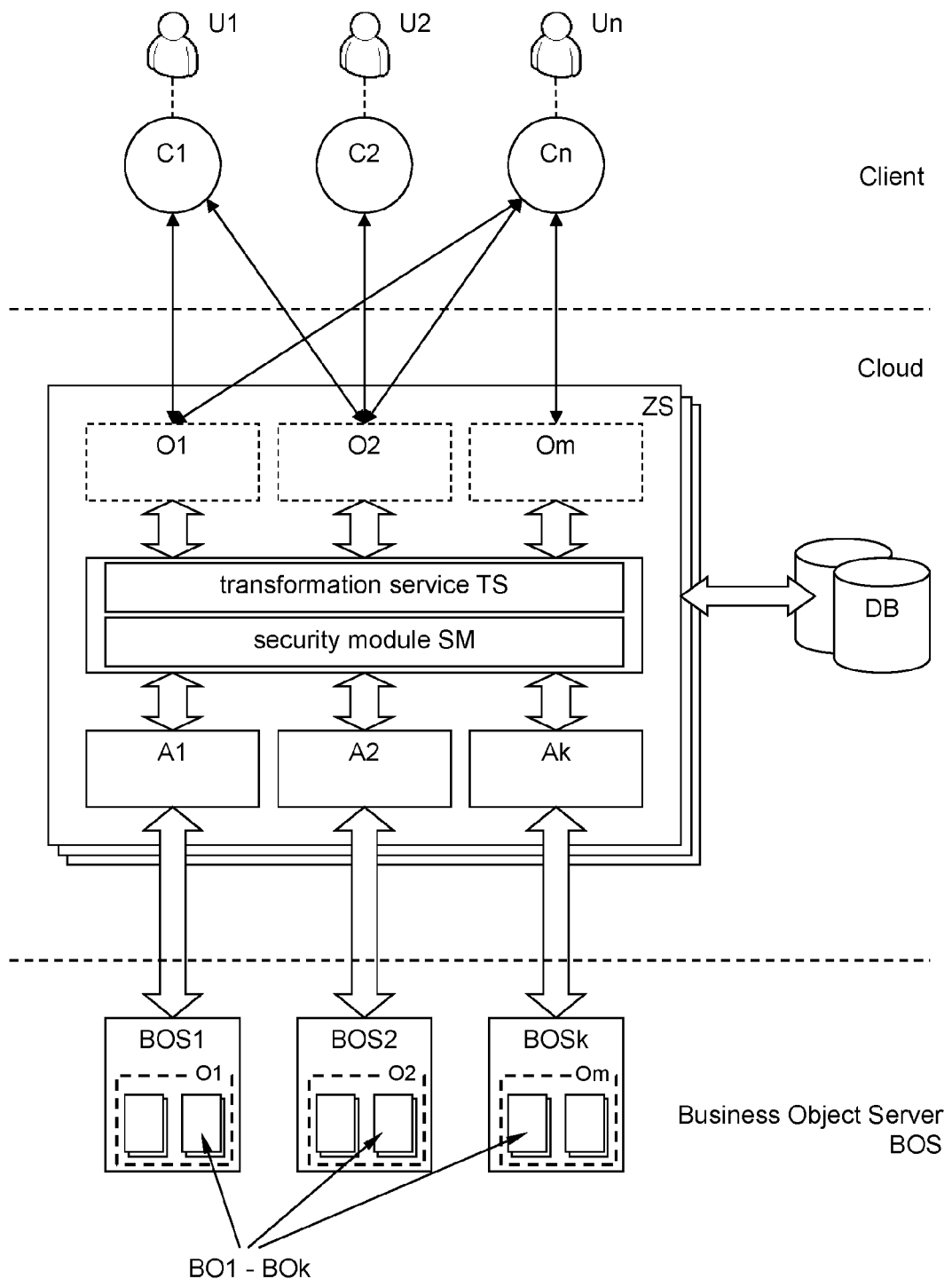
FIG. 1 shows a schematic overview of an architecture of the network system according to an embodiment of the invention.

This disclosure describes the best mode or modes of practicing the invention as presently contemplated. This description is not intended to be understood in a limiting sense, but provides an example of the invention presented solely for illustrative purposes by reference to the accompanying drawings to advise one of ordinary skill in the art of the advantages and construction of the invention. In the various views of the drawings, like reference characters designate like or similar parts.

FIG. 1 shows a configuration of an architecture of the system according to an embodiment of the invention or distributed network system for accessing data schematically.

The distributed network system basically comprises a central server system ZS, a number of client means C1, C2, Cn, and a number of business object servers BOS1, BOS2, BOSk. The client means and the business object servers are respectively coupled to the central server system ZS via a communication network, as the Internet.

The client means, for examples, are conventional personal computers, portable minicomputers, or smart phones. Via a client means, a user U1, U2 accesses the business object servers and reads or writes data (business objects) from or on the business object servers.

A business object server, for example, is a server means, in which one or more applications are running. An application, for example, is a standard application or a proprietary application. Examples for an application are, for example, mail server, content management systems, finance applications, but also database systems.

In the business object servers, BOS1, BOS2, BOSk, a number of business objects BO1 to BOk are stored respectively. Each user accesses the business objects stored on the business object servers via a client means, wherein on the basis of predetermined access authorizations, it is determined which business objects a user accesses.

A business object is composed of data, which describes the business object, and, if needed, of methods, by means of which the data is manipulated, i.e., processed. Examples for business objects are, for example, documents, invoices, e-mails, files, products, customers, etc.

The business objects stored in the business object servers are respectively assigned to an office (logical office), wherein each user or each client means is allowed to have access to a number of offices. An example of the assignment of business objects to offices, which are respectively stored in the business object server, and examples for the access to different business objects by a user are further described with reference to FIG. 2. It is important that each business object is only assigned to exactly one office.

An office is a definition, which logically combines the business objects (logical office), wherein business objects of different business object classes are assigned to each office.

The central server system ZS comprises a number of server means being coupled to a database DB. The central server system, in the embodiment shown here, is located in the cloud such that a simple access to the central server system by the client means via the Internet is ensured.

The central server system ZS, moreover, comprises at least one transformation service TS, a security module SM, and a number of adapters A1, A2, Ak.

Via the adapters A1, A2, Ak, the access from the central server system to the individual business object servers is carried out. In case, for example, a relational database system is concerned with respect to a business object server, the adapter is configured as SQL adapter (SQL client). If a business object server, for example, provides a web service for access to the business objects stored in the business object server, the adapter is configured to call functions or methods of the web services.

The central server system ZS is adapted according to the invention to select, depending on the type of the business object servers or depending on the business objects to be read in the business object servers, a suitable adapter from a number of adapters, in order to realize the access to the business objects to be read.

The access to the business objects stored in the business object servers by a client means is described in further detail in the following.

A user U1 registers with the central server system ZS via a client means C1, wherein at least one client identifier CK is transmitted from the client means C1 to the central server system ZS. The client identifier CK is a unique identifier of the user or a unique identifier of the client means. On the basis of the received client identifier CK, the security module SM of the central server system ZS determines, which offices the user U1 is able to access. Further, the security module SM determines which business objects of the offices, which the user U1 accesses, the user is able to access.

On the basis of the access authorizations determined by the security module SM, the central server system ZS allows access to the offices O1 and O2 to the user U1 or the client means C1, wherein the offices O1, O2, and Om in FIG. 1 are shown in the central server system ZS for a better understanding, in order to illustrate that, for example, the user U1 has access to the offices O1 and O2, and the user U2, for example, to the office O2. The offices O1, O2, and Om shown in FIG. 1 in the central server system ZS correspond to offices in the business object servers BOS1 to BOSk.

As already explained above, each business object server BOS1 to BOSk comprises a number of offices, wherein each business object BO1 to BOk in the respective business object server is assigned to (exactly) one office.

According to a preferred embodiment of the invention, the offices, which a user U1 accesses, are transparent for the user U1. This means that, if the central server system ZS transmits business objects from the business object server to the client means C1, it is not visible for the user U1, from which business object server the transmitted business objects, in fact, are. According to the invention, the user U1, for each transmitted business object, requests information from the central server system ZS on which business object server or in which office a business object is stored.

In the example shown in FIG. 1, the user U1 has access to the offices O1 and O2, the user U2 to the office O2, and the user Un to the offices O1, O2, and Om.

After a successful login, the user U1 requests at the central server system, business objects of a certain business object class. For example, the user U1 requests documents (the business object class here is "document"), to which he/she has access independently of on which business object servers or in which offices of the business object servers the documents are stored. This request, for example, is made in that the user U1 transmits via the client means C1 to the central server system ZS, an object class identifier, for example, "document". By means of the client identifier CK and the object class identifier, the central server system is now able to determine from which business object servers or from which offices documents are read for the user U1 in which business object servers.

To which concrete documents (i.e., forms of the business object class "document") the user U1, in fact, has access is determined by the security module SM, wherein the access authorizations for a concrete document either is stored in the central server system ZS or in the corresponding business object server.

After the central server system ZS has determined, in which business object server or in which offices the requested documents are stored, the central server system generates access instructions ZI, by means of which the central server system ZS is enabled to read the requested business objects (in this example documents) from the respective business object servers or from the offices in the business object servers. In order to be able to access the respective business object server, the central server system ZS selects a suitable adapter A1, A2, Ak depending on the respective business object server and/or depending on the business object class, which subsequently reads the respective requested business objects according to the access instructions and provides them for transmission to the client means C1.

Prior to the transmission of the business objects read to the client means C1, it is provided for the central server system to harmonize the business objects read by the business object server, in order to be able to provide to the user U1a uniform, i.e., harmonized view on the requested business objects. For this, in the central server system ZS, the transformation server or the transformation service TS is provided, which transforms the business objects read by the business object servers from a server data structure into a client data structure. By the transformation, the business objects read are unified, i.e., are brought down to a common denominator. An example for the transformation according to the invention is described in further detail with reference to FIG. 4.

Transforming business objects from a server data structure into a client data structure or harmonizing of business objects read does not mean that a matching of data (data matching), i.e., of business objects takes place or is being executed. A data matching (matching of business objects), thus, is not necessary, because each business object only occurs exactly for one time. I.e., a business object neither occurs in an office more than one time, nor the business object is present in more than one office. Therefore, it is not necessary to match different unique identifiers (e.g., an ID) or of several otherwise identical business objects, to either assign the same identifier to each identical business object, or to combine the several identical business objects to one business object.

After the business objects are transformed, i.e., harmonized, the transformed business objects are transmitted to the client means C1 upon request by the user U1, where they are displayed in a view unified for the user U1.

The transformation rules necessary for the transformation preferably are stored in the database DB.

Above, it has been described, how a user U1 accesses business objects for reading purposes, which are stored in different offices and in different business object servers. Accordingly, a user U1 also writes business objects in an office in a certain business object server. For this, the data of the business object to be written is transmitted from the client means C1 to the central server system ZS preferably together with an office identifier. The security module SM determines prior to the writing of the business object, whether the user U1 has, in the corresponding office, the access authorizations necessary for the writing. Is this the case, the transformation service TS transforms the business object received from the client means C1 from a client data structure into a server data structure, in order to ensure that the business object is stored in the office of the business object server correctly.

The transformation or the harmonization of the business objects is necessary during the writing as well as during the reading of the business objects, because a business object class, e.g., documents, is structured differently in different business object servers or also in different offices in a business object server. For example, the business object class "documents", in a first office comprises ten attributes, whereas the business object class "documents" in a second office, for example, only comprises five attributes. An example for a transformation of a business object from a client data structure into a server data structure also is described in further detail with reference to FIG. 4.

The access procedure described above has several advantages:

In a business object server, a number of different offices are defined, whereby a number of business objects are assigned to an office and a business object server. With respect to several business object servers having respectively a number of offices, in which a number of business objects are respectively stored, a user is allowed to access business objects in different offices in different business object servers, whereby the individual business objects are presented to the user in a harmonized form.

For the user, it is transparent, in which offices and in which business object servers the business objects are stored, which the user has access to.

In a business object server, different applications or several instances of an individual application runs, whereby each application or each instance of an application is an own office, or wherein for each application or for each instance of an application, a number of offices are defined.

For example, an application A runs on a first business object server, and an application B runs on a second business object server, whereby in the application A, several offices are defined, and whereby the application B represents a single office. In case business objects of a certain business object class are stored in all three offices, and a user has access to these three offices, the user reads or writes the business objects of this business object class, as far as he/she has a corresponding access authorization for the respective business objects of the business object class. Hereby, for the user it is transparent that in the first business object server, an application having two offices and in the second business object server an application, which represents an own office, are running. Further, it is also transparent to the user that the business objects are stored on different business object servers.

Figure 2:
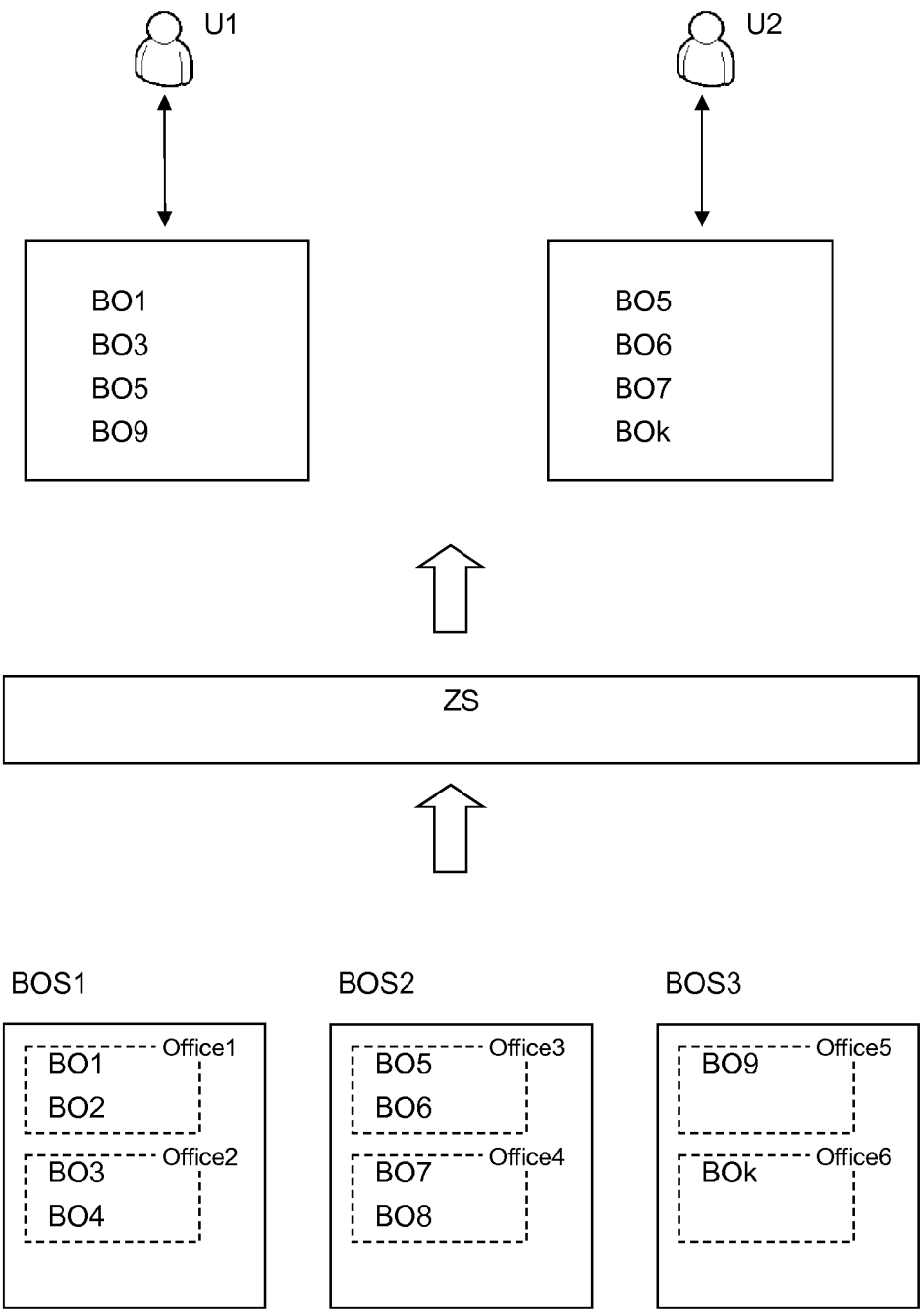
FIG. 2 shows an example of various business object servers with respectively several offices to which a user has access.

FIG. 2 shows an example of several business object servers, in which a number of business objects are stored, and two users U1, U2, who respectively are provided with business objects, to which the respective user has access.

In FIG. 2, three business object servers BOS1, BOS2, and BOS3 are shown. Each one of the three business object servers has two offices, or in each one of the three business object servers, two offices are defined. For example, in the business object server BOS1, the offices "Office 1" and "Office 2" are defined. Two business objects are respectively assigned to the offices in the business object servers BOS 1 and BOS2, while in the business object server BOS3, respectively, one business object is assigned to the two offices. The user U1 has access to the offices "Office 1" and "Office 2" in the business object server BOS1, to the "Office 3" in the business object server BOS2, and to the "Office 5" in the business object server BOS3, wherein the user U1 respectively only is permitted to access some business objects of the respective offices.

After the central server system ZS has received from the user U1 an access request message, the central server system ZS determines on the basis of the access authorization for the user U1, which business objects from which offices or business object servers the user U1 is permitted to read. On the basis of the determined access authorizations, the central server system ZS (by means of the adapter described above) reads the business object BO1 from the Office 1, the business object BO3 from the Office 2, the business object BO5 form the Office 3, and the business object BO9 from the Office 5, transforms the business objects read, and transmits the transformed business objects BO1, BO3, BO5, and BO9 to the client means of the user U1.

Subsequent to an access request message, which has been received by the central server system ZS from the user U2, the corresponding business objects BO5, BO6, BO7, and BOk for the user U2 are read from the respective offices in the business object servers, and are transmitted to the client means of the user U2 after a transformation.

In both cases, the transformation effects that the users U1, U2 obtain the synchronized view on the business objects read, although the business objects are stored in different business object servers or different offices in the business object servers.

In the example shown in FIG. 2, the business objects are stored in business object servers. Alternatively or additionally, business objects are also stored in the central server system ZS directly. Further, in the central server system, also offices are defined, to which business objects are assigned.

It is important that each business object is only present in a single office, i.e., is only assigned to one single office.

Figure 3:
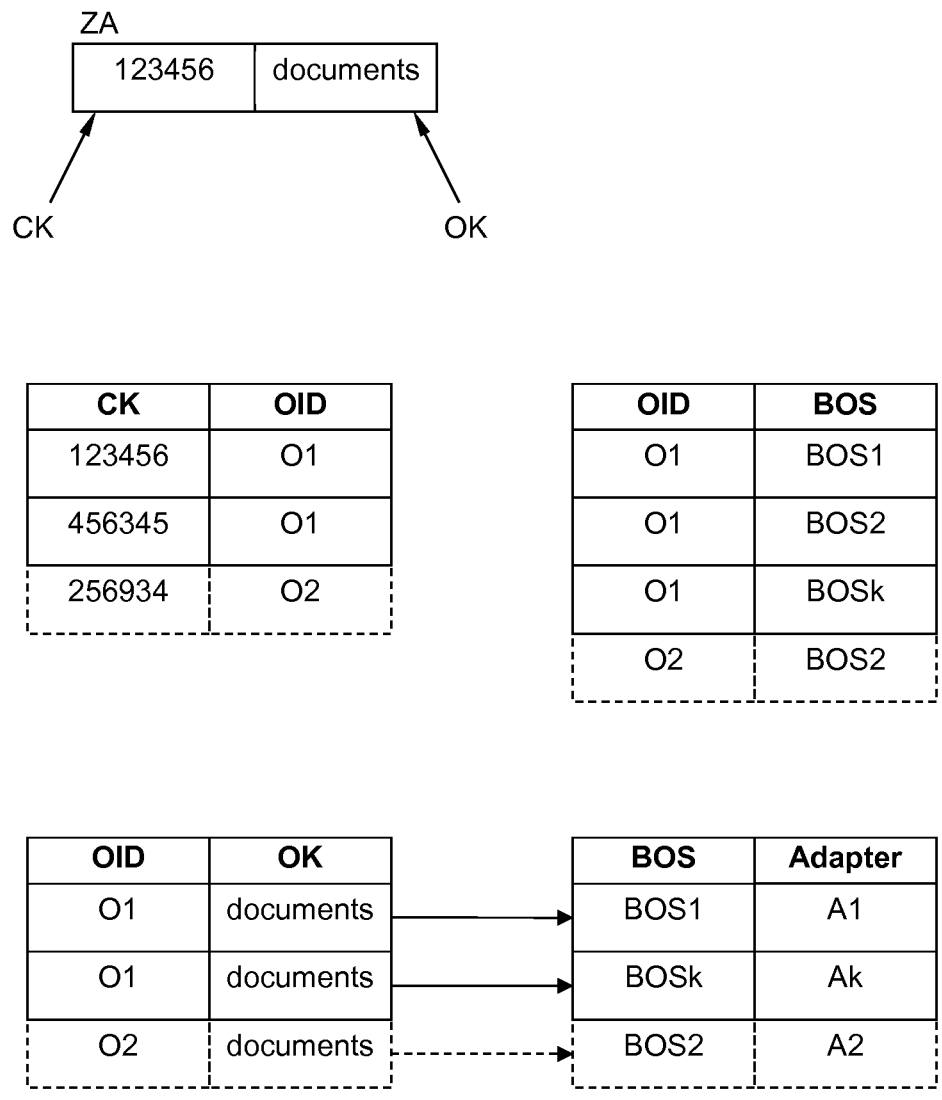
FIG. 3 shows an example for the structure of an access request message as well as examples of relations, by means of which it is determined, to which business object servers a user has access, and at which business object servers, the business objects are stored, which the user has requested.

FIG. 3 shows an example of an access request message ZA and several relations, on the basis of which it is determined, on which business object servers the business objects of a business object class are stored, and which adapters are to be selected for the access to the respective business objects.

The access request message in the example shown here has a client identifier CK and a business object class identifier OK. The client identifier is a unique identifier of a client means or a unique identifier of a user. The business object class identifier OK indicates, which business objects of which business object class should be read.

In a first relation, the client identifiers and the office identifiers OID assigned to a client identifier are stored. For example, the office identifier "O1" is assigned to the client identifier "123456", i.e., a user on a client means having the client identifier "123456" has access to the office having the office identifier "O1", and, therefore, reads business objects in the office O1.

In a second relation, business object servers BOS are assigned to the office identifiers. For example, the business object servers BOS1, BOS2, and BOSk are assigned to the office identifier O1, meaning that respectively a part of the office having the office identifier O1 is present on the business object servers.

In a third relation, a tuple from business object server and adapter is assigned to a tuple from office identifier and business object class identifier. On the basis of the third relation, it is determined, which adapter is to be used for a certain business object class on a certain business object server, in order to access the business objects.

For example, for the business object class documents in the Office O1 on the business object server BOS1, the adapter A1 is to be used, while for the business object class documents in the Office O1 on the business class object server BOSk, the adapter Ak is to be used. With the third relation, it is ensured that for the business objects to be read depending on the business object class, the correct adapter is respectively used by the office and by the business object server.

An adapter is, for example, an SQL client, if the business objects are stored in an SQL server. Further, an adapter is, for example, an Oracle client, if the business objects are stored in an Oracle server. Basically, an adapter provides an interface, by means of which business objects are accessed in a business object server. How the adapter is configured concretely, substantially depends on the business object server which is to be accessed. For example, the adapter is provided for a certain business object server by the provider or operator of the business object server to the central server system ZS.

Figure 4:
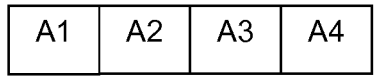
FIG. 4 shows an exemplary structure of a master class as well as the structure of three different business objects, which are stored in the three different business object servers for the transformation services.
Figure 4:
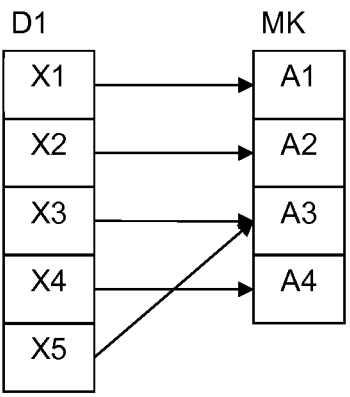
Figure 4:
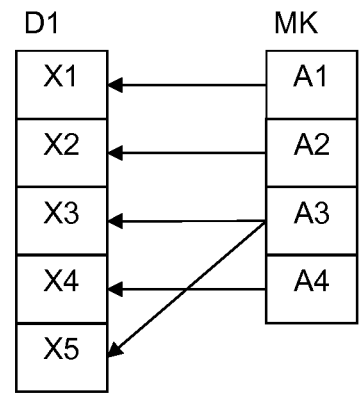
Figure 4:
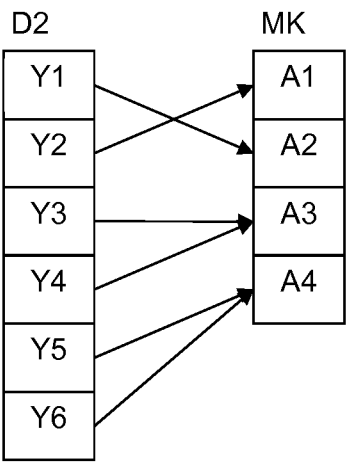
Figure 4:
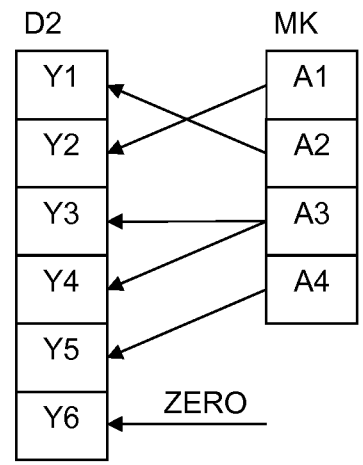
Figure 4:
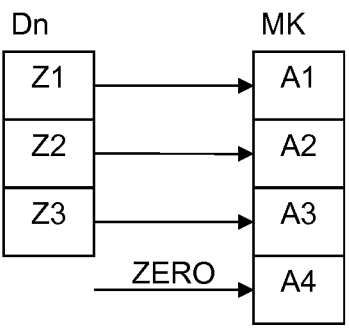
Figure 4:
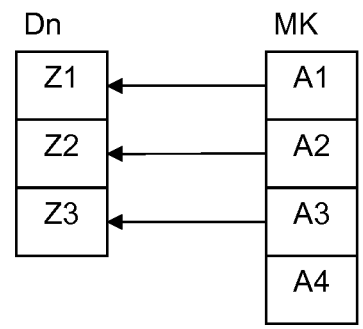

FIG. 4 shows examples for a transformation of business objects from a server data structure into a client data structure, and examples for a transformation of a business object from a client data structure into a server data structure.

A master class MK is shown, which defines a business object class, as "documents". The master class MK comprises four attributes A1 to A4. A transformed or harmonized business object has four attributes of the master class MK. Thereby, the master class MK represents the common denominator for the business objects "documents", which respectively comprises different and/or a different number of attributes.

The master class MK is an abstract business object class, from which concrete business object classes are deduced. For example, from an abstract business object class "files", the concrete business object classes "patent file" or "personnel file" are deduced, whereby each of the deduced classes comprises additional attributes. In case, for example, business objects of the classes "patent file" and "personnel file" are requested, the transformation service transforms the concrete business objects (i.e., instances of the classes "patent file" and "personnel file") into instances of the business object class "files", because the classes "patent file" and "personnel file" are deduced from the class "files". On the other hand, in case only business objects of the class "patent file" are requested, a transformation is possibly omitted.

During reading of the business objects from the business object servers, the business objects read are transformed by means of a number of transformation rules into an instance of the master class MK. The transformation rules, thereby, indicate, which attributes of a business object are mapped to which attributes of an instance of the master class.

FIG. 4a shows a transformation of three business objects D1, D2, Dn, which is stored in different business object servers, into an instance of the master class MK. The business object D1 has five attributes X1 to X5, which are transformed into the attributes A1 to A4 of an instance of the master class MK. According to the transformation rules, the attributes X1, X2, and X4 of the business object D1 are mapped to the attributes A1, A2, and A4, respectively, of the instance of the master class MK (1:1 mapping). The attributes X2 and X5 of the business object D1 are transformed into or mapped to the attributes A3 of the master class MK (associated mapping).

For the business object D2, two 1:1 mappings and two associated mappings are defined, which transform the six attributes Y1 to Y6 of the business object D2 into the four attributes A1 to A4 of the instance of the master class MK.

For the business object Dn, three 1:1 mappings are defined, which transform the attributes Z1 to Z3 of the business object Dn into the attributes A1 to A3 of the instance of the master class MK. Further, here a transformation rule has been defined, which indicates that a constant value (here ZERO) is to be written into the attribute A4 of the instance of the master class MK.

All three business objects D1, D2, and Dn, accordingly, are transformed into an instance of the master class MK, whereby the three instances of the master class MK respectively have the same attributes such that a user is provided with a synchronized view on the business objects after the transformation.

FIG. 4b shows a transformation of instances of a master class MK into respectively one business object. Hereby, business objects of a client data structure are transformed into a server data structure, in order to be able to store the transformed business objects correctly in the business object servers or in the offices of the business object servers.

In a first example, the attributes A1 to A4 of an instance of the master class MK are transformed into the attributes X1 to X5 of the business object D1, wherein for the attributes A1, A2, and A4 of the instance of the master class, a 1:1 transformation is defined. For the attribute A3 of the master class MK, a transformation rule has been defined, which maps the value of the attribute A3 to the attribute X3 and to the attribute X5 of the business object D1. For example, a part of the value of the attribute A3 is written into the attribute X3, and another part of the attribute A3 into the attribute X5 of the business object D1.

In the second example, the attributes A1 to A4 of an instance of the master class MK are transformed into the attributes Y1 to Y6 of the business object D2, wherein here, a transformation rule is provided additionally, by means of which a constant value (here ZERO) is written into the attribute Y6 of the business object D2.

In the third example, the attributes A1 to A4 of an instance of the master class MK are transformed to the attributes Z1 to Z3 of the business object Dn, whereby for the attribute A4, no transformation rule is provided such that only the attributes A1 to A3 are mapped according to a 1:1 mapping to the attributes Z1 to Z3 of the business object Dn.

By the transformation of the client data structure into a server data structure, it is ensured that the business objects to be written are written correctly into the respective offices or into the respective business object servers.

Thereby, it is not only possible to access offices in the business object servers in a reading manner, but rather to also store business objects in different offices of different business object servers.

Figure 5:
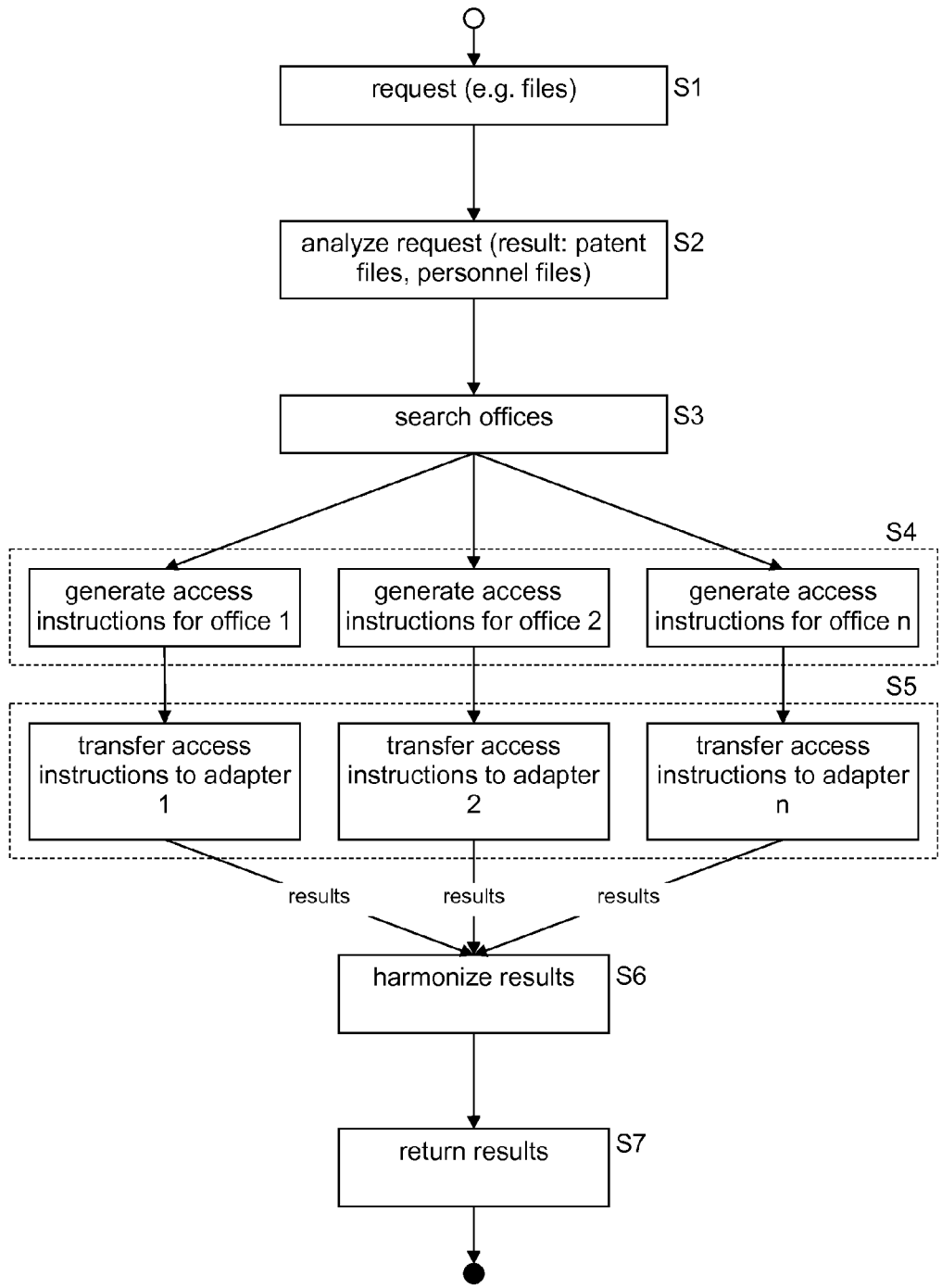
FIG. 5 shows a flowchart relating to the method according to an embodiment of the invention.

FIG. 5 shows a flowchart of the method according to the invention.

In a first step S1, the central server system ZS receives a request, i.e., an access request message from a client means. In the example shown here, the client means requests all files, to which a user of the client means has access. Within the scope of the access request message, "files" is a business object class for which a user requests concrete instances, i.e., business objects.

In a further step S2, the central server system analyzes the received request. Hereby, the central server system determines for the business object class "files" all business object classes used directly or indirectly. According to the present example, these are the business object classes "patent files" and "personnel files". Further, the central server system determines, to which ones of the business object classes "patent files" and "personnel files" determined the requesting user has access. In the present example, it is assumed that the requesting user is authorized to access both business object classes "patent files" and "personnel files". By this analysis, it is possible, to determine already prior to the access to concrete business objects, which concrete business objects have to be read at all. The network load between the central server system and the business object servers, in which the concrete business objects are stored, thus are reduced substantially.

In the subsequent step S3, the central server system determines the offices, in which the requested business objects are stored. By means of the determined offices and the determined business object classes, the central server system also determines the required adapters, via which the accesses to the concrete business objects are executed. In the example shown here, the offices "Office 1", "Office 2", and "Office n" have been determined.

In the steps S4 and S5, the central server system generates for each office (depending on the concrete business object class, which in the respective office is accessed) access instructions (S4), and transfers the access instructions to the respective adapters (S5). According to a preferred embodiment of the invention, the access instructions are formulated or defined in the notation of a so-called Business Query Language (BQL). This has the advantage that the access instructions basically are defined independently of the concrete definition of the business object classes in a standardized form.

The access instructions or the access instructions defined in the Business Query Language are then translated by the respective adapter into concrete requests (e.g., database requests, function calls, web service calls, etc.), which are adapted to access the respective business object server. The adapters then execute the concrete requests, or access by means of the concrete requests, the respective business object servers.

Accordingly, with respect to the access instructions, not only information uniquely identifying a user, e.g., a token, are concerned, but it rather comprises information, by means of which an adapter generates or creates concrete instructions (e.g., SQL commands, ABAP programs, Web Service calls, or the like), by means of which certain or requested business objects are read or selected from the offices.

Upon the respective request, the business object servers return results (concrete business objects) to the respective adapter or to the central server system.

In the step S6, the results are harmonized by the central server system, as described with reference to FIG. 2 and FIG. 4. By harmonizing the results, a uniform view onto the requested business objects is enabled for the user, who has posed the request, without the user having to know, from which concrete office or business object server the business objects are originating. Offices and business object servers are transparent for the user.

In the next step S7, the harmonized results or business objects are transmitted to the client means, where they are displayed at a display means.

REFERENCE NUMERALS

A1, A2, Ak adapters
BOS1, BOS2, BOSk business object server
BO1-Bok business objects (instances of a business object class)
C1, C2, Cn client means
Ck client identifier
D1, D2, Dn structure of a business object class
DB database
MK master class
O1, O2, Om offices
OID office identifier
OK business object class identifier
S1 to S7 method steps
SM security module
TS transformation service
U1, U2, Un user
ZA access request message
ZI access instructions
ZS central server system While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention. Furthermore, the foregoing describes the invention in terms of embodiments foreseen by the inventor for which an enabling description was available, notwithstanding that insubstantial modifications of the invention, not presently foreseen, may nonetheless represent equivalents thereto.

What is claimed is:

1. A method for accessing data by a client in a distributed network system having a central server system (ZS), at least one client (C1, C2, Cn), and at least one business object server (BOS1, BOS2, BOSk), wherein the at least one client and the at least one business object server are coupled to the central server system via a communication network, wherein in the at least one business object server, a number of business objects (BO1-Bok) are stored, characterized in that
  each business object server comprises a number of logical representations of offices, wherein each business object is assigned to a logical representation of an office (O1; O2; Om) in the respective business object server,
  the central server system (ZS) of the client receives an access request message (ZA), wherein the access request message comprises at least one unique client identifier (CK),
  the central server system (ZS) determines at least one access authorization by means of the client identifier, wherein an access authorization indicates, which logical representations of offices and which business objects of the logical representation of offices the client is allowed to access, and
  the central server system (ZS) generates access instructions (ZI) for the business objects, which the client is allowed to access, wherein the business objects are read from the respective logical representation of the office in the respective business object server by means of the access instructions, and are transmitted to the client;

wherein the central server system (ZS) harmonizes the business objects prior to the transmission to the client, wherein the central server system comprises a transformation service (TS) for harmonizing the business objects read, wherein the transformation service, after reading the business objects, transforms the business objects from a server data structure into a client data structure, and provides the transformed business objects for transmission to the client, and wherein the transformation of the business objects from the server data structure into the client data structure is effected on the basis of predetermined transformation rules, wherein each of the transformation rules indicate, which data field of the server data structure is transformed into which data fields of the client data structure.

2. The method according to claim 1, wherein in the central server system (ZS)

in a first relation, the client identifier (CK) is assigned to at least one office identifier (OD), wherein the office identifier identifies a logical representation of an office in the business object servers uniquely, in a second relation, an office identifier (OID) is assigned to a business object server, and in a third relation, at least one tuple from a business object server and an adapter (A1, A2, Ak) is assigned to a tuple from an office identifier (OID) and an object identifier (OK), wherein the relations are stored in a database (DB), which is coupled to the central server system operatively, wherein the central server system determines, by means of the first and second relations, which business object servers the client means is allowed to access, whereby the central server system, by means of the third relation, selects an adapter and transmits to the selected adapter, the access instructions (ZI) for reading the business objects.

3. The method according to claim 2, wherein the access instructions (ZI) are translated by the respective adapters into concrete requests, which are adapted to access the respective business object servers, and wherein the respective adapters execute the concrete requests, or, by means of the concrete requests, the respective business object servers.

4. The method according to claim 3, wherein the concrete requests comprise at least one selected from data base requests, function calls, WebService calls, and a combination thereof.

5. The method according to claim 1, wherein the access instructions (ZI) comprise at least the client identifier (CK).

6. The method according to claim 1, wherein the central server system comprises a security module (SM), which determines the access authorizations, wherein the access authorizations are stored in the central server system and/or in the business object servers.

7. The method according to claim 1, wherein the central server system (ZS), prior to receiving the access request message (ZA), receives login data from the client, wherein the login data comprise at least the client identifier (CK).

8. The method according to claim 7, wherein the central server system (ZS) determines, by means of the client identifier (CK) received with the login data, the office identifier (OM) assigned to the client identifier (CK) and the first relation automatically such that the client is logged in automatically into the offices identified by the office identifiers.

9. The method according to claim 1, wherein the network system comprises at least two business object servers with respectively at least two logical representations of offices.

10. The method of claim 1, wherein to each business object server an adapter (A1-Ak) is assigned, wherein the central server system transmits the access instructions to the respective adapter, wherein the access instructions are translated by the respective adapters into concrete requests, which are adapted to access the respective business object servers, and wherein the respective adapters execute the concrete requests.

11. A system for accessing data by a client, wherein the system comprises at least one central server system (ZS), wherein the central server system is coupled to at least one client (C1, C2, Cn) and to at least one business object server (BOS1, BOS2, BOSk) via a communication network, wherein in the at least one business object server, a number of business objects are stored, wherein each business object server comprises a number of logical representations of offices, wherein each business in the respective business object server is assigned to a logical representation of an office (O1, O2, On), and wherein the central server system comprises means for receiving an access request message (ZA) from the client means, wherein the access request message comprises at least one unique client identifier (CK), comprises means, which are adapted to determine by means of the client identifier, which logical representations of corresponding offices and which business objects of the logical representations of offices the client is allowed to access, comprises a number of adapters (A1, A2, Ak), whereby the central server system is adapted to select, for each business object, which the client is allowed to access, an adapter from the number of adapters, and to transmit access instructions (ZI) to the respective adapter, wherein each adapter is adapted to read, by means of the access instructions, business objects from the respective business object server, and to provide the business objects read for transmission to the client, wherein the central server system comprises a transformation service (TS), wherein the transformation service is adapted, after reading the business objects from the business object servers, to transform the business objects read from a server data structure into a client data structure on the basis of predetermined transformation rules, in order to harmonize the business objects read.

12. The system according to claim 11, further comprising a database (DB), which is coupled to the central server system operatively, wherein in the database a first relation is stored, by means of which a client identifier (CK) is assigned to at least one office identifier (OID), wherein the office identifier uniquely identifies logical representation of an office in the business object servers, a second relation is stored, by means of which an office identifier (OID) is assigned to a business object server (BOS1, BOS2, BOSk), and a third relation is stored, by means of which a tuple from an office identifier (OD) and an object identifier (OK) is assigned to at least one tuple from a business object server and an adapter (A1, A2, Ak), wherein the central server system is adapted to determine by means of the first and second relations, which business object servers the client is allowed to access, and by means of the third relation, to select an adapter and to transmit to the selected adapter, the access instructions (ZI) for reading the business objects.

13. The system according to claim 11, wherein the central server system comprises a security module (SM), which is adapted to determine by means of the client identifier (CK), which logical representations of offices and which business objects of the logical representations of offices the client means is allowed to access.

14. The system according to claim 11, wherein the access instructions (ZI) can be translated by the respective adapter into concrete requests, which are adapted to access the respective business object servers, and wherein the respective adapters are adapted to execute the concrete requests, or to access by means of the concrete requests, the respective business object servers.

15. The system according to claim 11, wherein the central server system (ZS) comprises a login module, by means of which login data is received from the client, wherein the login data comprise at least the client identifier (CK).

16. The system according to claim 15, wherein the central server system (ZS) is adapted to determine, by means of the client identifier (CK) received together with the login data, the office identifiers (OID) assigned to the client identifier (CK) in the first relation automatically such that the client is logged into the logical representations of offices identified by the office identifiers automatically.

17. The system according to claim 11, wherein the central server system (ZS) is located within a cloud, and wherein the communication network is configured as wireless and/or wired Internet connection.

18. A method for accessing data, which is stored in at least one business object server (BOS1, BOS2, BOSk), wherein the at least one business object server is coupled to a central server system (ZS), wherein the central server system is coupled to at least one client (C1, C2, Cn), wherein each business object server comprises a number of logical representations of offices, wherein each business object in the respective business object server is assigned to a logical representation of an office (O1, O2, On), and wherein the central server system, after a user has registered with the central server system (ZS) via a client, logs the registered user into a number of logical representations of offices, which are assigned to the user, automatically, and the central server system allows the registered user access to those business objects, which are assigned to the logical representations of offices, into which the user is logged in, and for which corresponding access authorizations are assigned to the user, wherein a transformation service (TS) of the central server system, after reading the business objects from the offices of the business object servers, transforms the business objects read from a server data structure into a client data structure, in order to harmonize the business objects read, and wherein the transformation is carried out according to a number of transformation rules, wherein each one of the transformation rules indicates, which data field of the server data structure is transformed into which data fields of the client data structure.

19. The method according to claim 18, wherein the central server system, after a user has registered with the central server system (ZS) via a client, receives an access request message (ZA) from the client, which comprises information on which business objects are to be read by the business object servers, and wherein the central server system (ZS) reads the business objects from the business object servers, and transmits the business objects read to the client.

20. The method according to claim 18, wherein the central server system (ZS), prior to reading the business objects, determines from which business object servers the business objects can be read.

21. The method according to claim 20, wherein the determining comprises a step in which it is checked, for which business objects of the client means or for which user of the client a corresponding access authorization is assigned, wherein the respective access authorizations are stored in the central server system (ZS) and/or in the business object servers.

22. The method according to claim 18, wherein for the user, the access to the logical representations of offices and/or the access to the business object servers is transparent.

23. The method of claim 18, wherein to each business object server an adapter (A1-Ak) is assigned, wherein the central server system transmits the access instructions to the respective adapter, wherein the access instructions are translated by the respective adapters into concrete requests, which are adapted to access the respective business object servers, and wherein the respective adapters execute the concrete requests.

* * * * *